United States Patent Office 2,836,035
Patented May 27, 1958

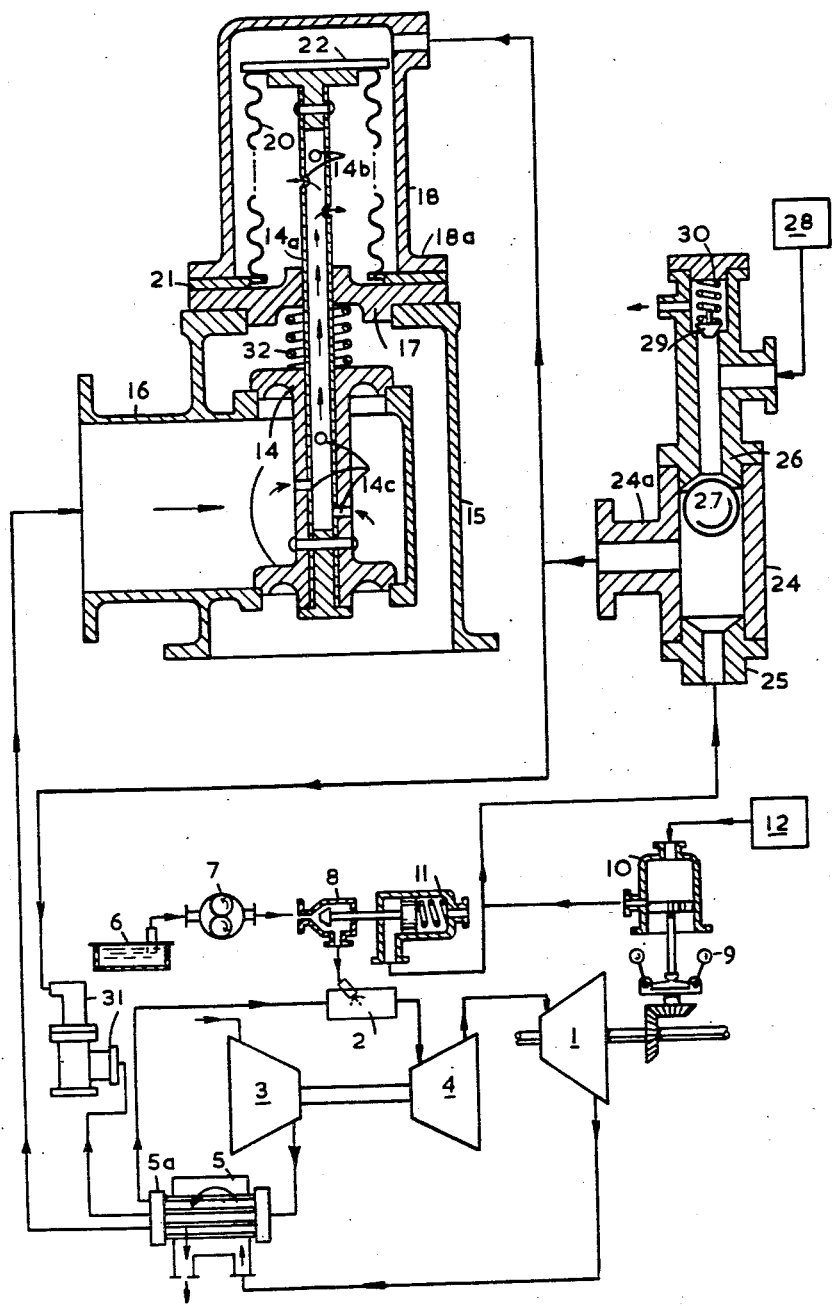

2,836,035

GOVERNING SYSTEM FOR GAS TURBINE PLANT

Herbert Edgar Chappell, Spalding, and Humphrey Gerald Waldock and Ronald Thomas Max Forman, Farnborough, England, assignors to Power Jets (Research and Development) Limited, London, England, a British company Application March 7, 1955, Serial No. 492,714

Claims priority, application Great Britain March 15, 1954

6 Claims. (Cl. 60—39.27)

This invention relates to gas-turbine plant of the kind wherein an output turbine for driving the load receives its hot working gas from a heating system supplied with air by an independently rotatable turbine-driven compressor set. The heating system is usually a combustion system wherein fuel is burnt in the air and the hot gas usually flows through the compressor-driving turbine and the output turbine in series.

In the usual speed-governing system for such plant a governor on the output turbine controls a throttle in the fuel supply to the heating system. On occasion, substantially the whole load may be removed from the output turbine—for example, when an electric generator forming the load is put on open-circuit. In response to the consequent increase of turbine speed the governor moves the throttle to reduce the rate of fuel supply to only that value required for idling.

If there is a heat exchanger for transfer of heat from the turbine exhaust gases to the air coming from the compressor, this exchanger with ducting connected to it has considerable air capacity. Other arrangements may also have such capacity. The air in this capacity helps temporarily to keep the turbines rotating on reduction of fuel supply. To aid in checking rise of speed of the output turbine, the governor when it moves the throttle to "idling" may open a blow-off valve to discharge air from the compressor. This valve recloses on fall of the output turbine speed. The unloaded output turbine may however maintain overspeed for some time, under its own momentum and possibly aided by the air stored in the capacity of the system. On the other hand the compressor-turbine set, still loaded, decelerates more quickly and the compressor pressure falls. It is the object of this invention to reduce risk that the compressor speed and pressure may fall to a value low enough to cause disturbances in the system and to maintain the plant in condition ready to cope with restoration of full load.

Broadly according to the invention plant of the kind set forth above is characterised by actuating means for the blow-off valve jointly responsive to the output-turbine speed and the speed or pressure of the compressor; thus on excess speed of the output turbine at normal compressor pressure the blow-off valve will open, and the valve will reclose on subsequent reduction of the speed of this turbine towards the normal operating value or on a decrease of compressor speed or pressure below normal.

More particularly, according to the invention, the blow-off valve is opened by a pressure dependent on the compressor pressure, in opposition to a closing pressure which is reduced by the action of the governor on overspeed; if subsequently the compressor pressure falls to a low value the reduced closing pressure will re-close the valve.

In the accompanying drawing an output turbine 1 for driving a load receives combustion gas from the combustion system 2 wherein fuel is burnt in air compressed by the compressor 3 driven by the independently-rotatable turbine 4. The plant includes a heat-exchanger 5. These components are connected so that air entering the compressor 3 and therein compressed passes through the heat exchanger 5 to the combustion system 2; combustion gas therefrom passes first through the H. P. turbine 4, then through the L. P. turbine 1 and the heat exchanger 5, to the exhaust. Fuel is supplied to the combustion system 2 from the source 6 by the pump 7 through the throttle-valve 8.

The speed-governor 9 driven by output turbine 1 acts in well-known manner through a fluid-pressure servo-system including the valve 10 and the servo-device 11 for closing the throttle 8; the governor can actuate the valve 10 to connect the device 11 either to the source 12 of fluid-pressure or to drain.

The governor 9 also controls a balanced blow-off valve in the form of a double-beat valve 14 within casing 15 which is open to exhaust. Connected to header 5a on heat-exchanger 5 is a duct 16 with its outlet controlled by the valve 14 which can open to vent the duct 16 into the open casing 15. The valve stem 14a slides through a cover 17 on the casing 15 between this casing and the flange 18a on the servo-casing 18, and so into the interior of the servo-casing. An enclosure within the latter casing, with its interior shut off from the casing 18 outside it, is formed by an expansible metal bellows 20 fixed to the servo-casing at one end only by being secured and sealed to ring 21, and closed at its free end by a cap 22. The ring 21 is held between the cover 17 and the flange 18a. The valve stem 14a extends through the bellows 20 and is attached to the cap 22. The valve 10 can admit fluid under pressure from source 12 into the servo casing 18 where it acts on the exterior of the bellows 20.

The arrangement thus far described is the known arrangement. The invention adds certain modifications to this, including, in particular, provision for the admission of air from the duct 16 into the interior of bellows 20. To this end the valve stem 14a is tubular and provides a passage extending to ports 14b opening into the interior of the bellows 18 from ports 14c in the valve, which open into the duct 16. By cutting off the fluid supply to casing 18 the force on the exterior of the bellows can be reduced to a determined low value, not zero. Part of the low force tending to close the valve 14 may however be provided by the spring 32 acting in a sense tending to close the valve, or by the springiness of the bellows 20 itself. Preferably however the fluid pressure in casing 18 is maintained at a determined low value to provide the desired low force. To this end, a changeover valve consisting of a valve body 24 with opposed seatings 25 and 26 controlling inlets respectively connected to the valve 10 and a low-pressure fluid supply source 28 has a ball valve 27 movable between the seatings to close up one inlet or the other according to the pressure thereon; body 24 has a branch 24a connected to the interior of the servo casing 18. A relief valve 29 loaded by spring 30 is provided on the body 24, on the low pressure side of the ball valve, and can open to connect the interior of the body to drain.

There will usually be more than one blow-off valve; if the heat exchanger 5 be annularly disposed around the axis of the turbine plant there may be a ring of such valves around the heat exchanger. A second blow-off valve with operating servo device is indicated at 31.

In operation, the high pressure of servo fluid from source 12 keeps the ball valve 27 against seating 26, thus closing the lower pressure inlet. This pressure also acts on the exterior of bellows 20, overcoming the air pressure inside the bellows and keeping valve 14 closed. On excess speed resulting from a complete removal of load from the output turbine 1 the governor valve 10 disconnects the source 12 from the servo device 11 to allow the throttle valve 8 to close, and to connect the casing 18 to drain, so that the air pressure in the bellows 20 will open the blow-off valve 14. The oil pressure from the low-pressure source 28 can now move ball valve 27 on to seating 25, thus connecting this low pressure to the servo casing 18. The relief valve 29 may now open to drain, if necessary, to maintain a substantially constant low pressure in the servo casing 18, but the air pressure within the bellows 20 can still keep the valve 14 open. When the speed of output turbine 1 decreases, the governor valve 10 restores the higher servo oil pressure to the casing 18 to reclose the valve 14 against the air pressure inside the bellows 20. If, before this, the air pressure falls below the chosen value (as a result of slowing down of turbine 4 and compressor 3) the low fluid pressure in the servo casing 18 can overcome the reduced air pressure in the bellows 20 and reclose the blow-off valve 14. To bring about a rapid opening of the blow-off valve 14, the fluid pressure in casing 18 preferably falls first substantially to zero and then rises to the low pressure after the blow-off valve 14 is opened. Thus the ball valve 27 should be somewhat sluggish in action or may be replaced by a slow-moving piston as a change-over valve.

We claim:

1. Gas turbine power plant of the kind comprising a power-output turbine, a heating system connected to supply hot working gas to said turbine, an independently rotatable compressor connected to supply compressed air to said heating system, and a blow-off valve in the air connection between said compressor and said heating system, said plant being characterised by the combination therewith of a speed governor on said turbine, actuating means for said blow-off valve, means for applying a fluid pressure to said actuating means in a valve-closing direction, means operable by said governor for reducing said fluid pressure in response to overspeed of said turbine and further means affording a communication to said actuating means for air compressed in said compressor for applying to said actuating means, in opposition to said fluid pressure, a force directly dependent on the pressure of said compressed air.

2. Plant according to claim 1 wherein said further means comprise a hollow tubular valve-stem constituting an operative connection between said blow-off valve and said actuating means and affording communication between the actuating means and the high pressure side of the blow-off valve.

3. Gas-turbine power plant of the kind comprising a power-output turbine, a heating system connected to supply hot working gas to said turbine, an independently rotatable compressor connected to supply compressed air to said heating system, and a blow-off valve in the air connection between said compressor and said heating system, said plant being characterized by the combination therewith of a speed governor on said turbine, a servo device comprising a casing, a bellows within the casing, and a valve stem constituting an operative connection between the said bellows and the said blow-off valve, means for applying to said servo device a fluid pressure acting on said bellows in a valve-closing direction, valve means operable by said governor for reducing said fluid pressure in response to overspeed of said turbine and further means affording a communication to said servo-device for air compressed in said compressor for applying to said servo device a force directly dependent on the pressure of said compressed air acting on said bellows in opposition to said fluid pressure.

4. Gas-turbine power plant of the kind comprising a power-output turbine, a heating system connected to supply hot working gas to said turbine, an independently rotatable compressor connected to supply compressed air to said heating system, and a blow-off valve in the air connection between said compressor and said heating system, said plant being characterised by the combination therewith of a speed governor on the said turbine, fluid-servo means for actuating said blow-off valve, a source of high pressure fluid connected to said actuating means for applying thereto a force acting in the valve-closing direction, a source of low pressure fluid, means operable by said governor in response to overspeed of said turbine for disconnecting said actuating means from said high pressure fluid source and connecting them to said low pressure fluid source and further means for applying to said actuating means, in a valve-opening direction, a force directly dependent on the pressure of said compressor.

5. Gas turbine power plant comprising a power-output turbine, a combustion system connected to supply combustion gas to said turbine as working fluid, an independently rotatable compressor connected to supply compressed air to said combustion system, a heat-exchanger connected to the exhaust end of said turbine and between said compressor and said combustion system for transferring heat from the exhaust gases to the air which is going to the combustion system, means for supplying fuel to the said combustion system, a regulating valve for interrupting said supply of fuel, a speed governor on said turbine, means actuated by said governor for actuating said regulating valve to reduce said supply of fuel on turbine overspeed, means responsive to the speed of the said compressor, a blow-off valve connected to the downstream end of the heat exchanger for discharging therefrom the air coming from the compressor and means acting, under the joint control of the said governor and said compressor-speed-responsive means, to open the said blow-off valve when said regulating valve reduces said supply of fuel and for reclosing the blow-off valve on a subsequent decrease of either compressor or turbine speed.

6. Gas-turbine power plant of the kind comprising a power-output turbine, a heating system connected to supply hot working gas to said turbine, an independently rotatable compressor connected to supply compressed air to said heating system, and a blow-off valve in the air connection between said compressor and said heating system, said plant being characterised by the combination therewith of a speed governor on the said turbine, fluid-servo means for actuating said blow-off valve, a source of high pressure fluid connected to said actuating means for applying thereto a force acting in the valve-closing direction, a source of low pressure fluid, means operable by said governor in response to overspeed of said turbine for venting said actuating means to reduce the valve-closing force to zero, a change-over valve operable in response to said venting to disconnect said actuating means from said high pressure fluid source and connecting them to said low pressure fluid source and further means for applying to said actuating means, in a valve-opening direction, a force directly dependent on the pressure of said compressor.

References Cited in the file of this patent

UNITED STATES PATENTS

| Re. 22,201 | Lysholm | Oct. 13, 1942 |
| 2,219,994 | Jung | Oct. 29, 1940 |
| 2,616,253 | Terce | Nov. 4, 1952 |
| 2,618,926 | Pfenninger | Nov. 25, 1952 |
| 2,670,598 | Van Millingen | Mar. 2, 1954 |

FOREIGN PATENTS

| 531,997 | Great Britain | Jan. 15, 1941 |